United States Patent Office 3,401,302
Patented Sept. 10, 1968

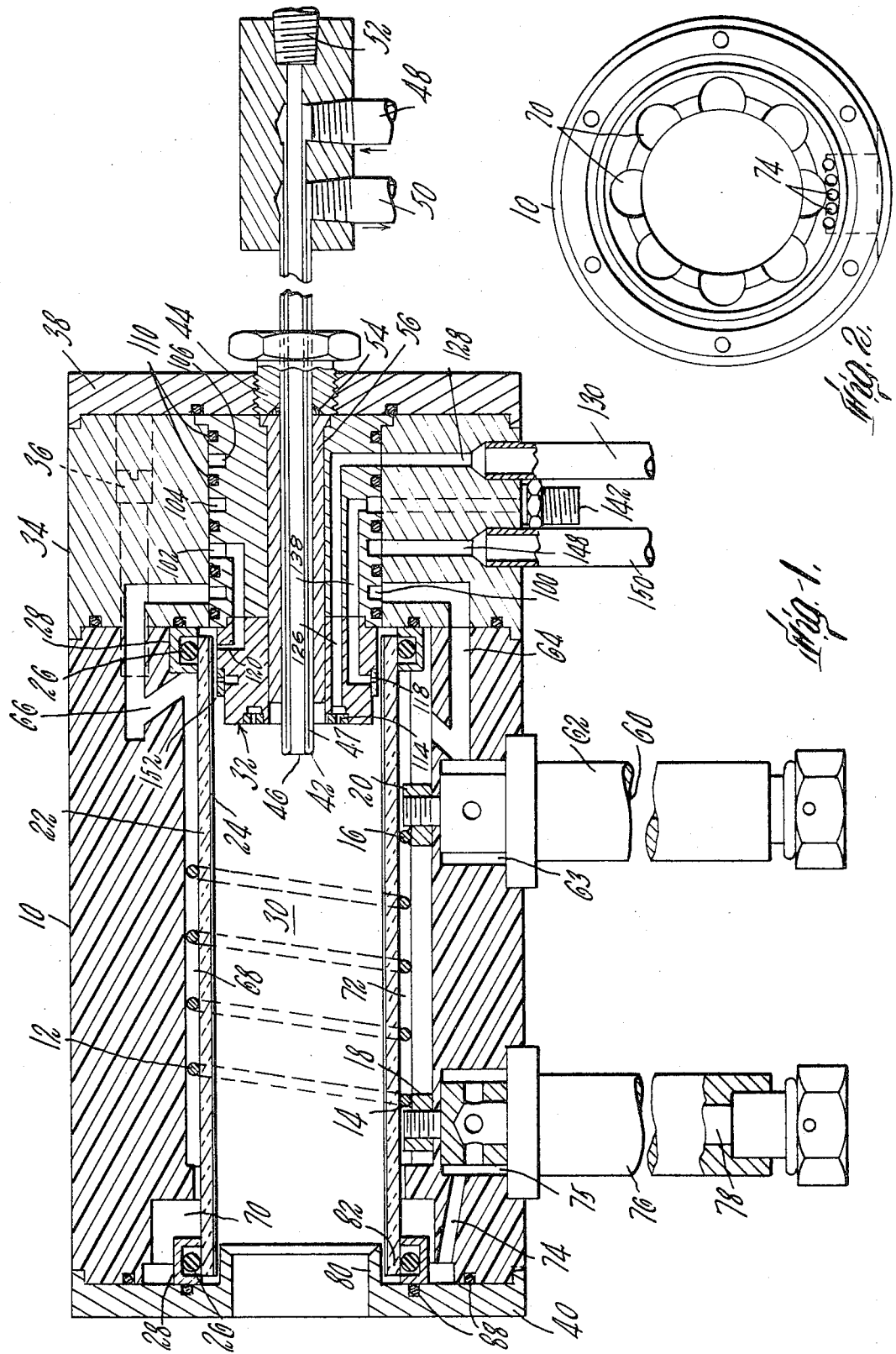

3,401,302
INDUCTION PLASMA GENERATOR INCLUDING COOLING MEANS, GAS FLOW MEANS, AND OPERATING MEANS THEREFOR
Merle L. Thorpe and Kent W. Harrington, Suncook, N.H., assignors to Humphreys Corporation, Concord, N.H., a corporation of New Hampshire
Filed Nov. 1, 1965, Ser. No. 505,924
25 Claims. (Cl. 315—111)

ABSTRACT OF THE DISCLOSURE

An RF plasma generator includes a 1½-inch diameter quartz tube which defines a plasma chamber. A solid copper electrical coil is wound around the tube and a Teflon housing is disposed over the tube and coil and sealed so that cooling water may be flowed over the coil in direct contact with the plasma chamber tube, simultaneously cooling both. A metal injector structure has three inlet passages, one of which communicates with six axially directed 0.028 inch diameter outlet ports; a second communicating with six radially directed 0.028 inch diameter outlet ports and the third communicating with three tangentially directed 0.033 inch diameter swirl ports. The second and third groups of ports discharge into an annular chamber from which the plasma forming gas is transferred into the plasma chamber with axial, laminar flow characteristics, a tangential component being introduced to the axial flow when necessary to make the axial velocity of the annular sheath uniform. At each end of the plasma chamber is a metal plate, the metal plate at the inlet end supporting the injector structure and the metal plate at the outlet end receiving a nozzle.

---

This invention relates to induction plasma generators and to methods for using such apparatus.

Induction plasma generators employ an intense electromagnetic field which produces electrical current flow in an ionized gas and resultant induction heating that creates a thermal plasma. This plasma is useful for many purposes such as the working of metallic and refractory materials, chemical reactions, and other processes including high temperatures. However, it has been difficult to generate a stable high power plasma. The plasma established within the generator must be stable against drift and the heat reaching the walls of the plasma chamber must be low enough to permit dissipation without damage to the integrity of that structure while producing a useful flame. Because the heat capacities and electrical resistivities of different gases when ionized are not the same, the load on a plasma generator power supply differs with each gas. Nitrogen and hydrogen require more energy to ionize than argon. Hence, an argon plasma for a given energy input has much greater diameter than that of nitrogen or hydrogen, which plasmas tend to be thermally pinched. Attempts to convert an induction generated argon plasma to a plasma of a diatomic gas have often not been successful because changes in the geometry of the plasma upset its stability and changed the coupling of the coil to the load (arc) indicating that changes in structural geometry and/or changes in the power supply characteristics (for example, frequency) were necessary for each gas.

A primary object of this invention is to provide an induction plasma generator which operates with improved stability on both monotomic and diatomic gases. It has now been found that particular structural geometries permit changes to be made in the operating gas without requiring structural changes in the generator or in its power supply.

Another object of the invention is to provide a plasma generator of increased versatility and practicality.

Another object of the invention is to provide in a plasma generator a novel and improved cooling configuration.

A further object of the invention is to provide a novel and improved plasma generator of increased power handling capabilities.

A further object of the invention is to improve the stability of and extend the range of operation of plasma generators.

Still another object of the invention is to provide a novel and improved method for controlling the operation of plasma generators.

Another object of the invention is to provide an induction plasma generator configuration capable of operating over an increased range of chamber pressures and gas flow rates.

A further object of the invention is to provide novel and improved arrangements for controlling the configuration of the plasma emanating from the generator.

In accordance with the invention, there is provided a plasma generator structure including a plasma forming chamber. A high-frequency electrical coil surrounds this chamber for creating an intense electromagnetic field within the chamber. An injector introduces the plasma forming gas at one end of the chamber for flow through that chamber and conversion into plasma for exit in a useful flame configuration. The gas flow is introduced in a manner which produces flow in an annular sheath along the wall of the chamber to provide a thermal barrier between the plasma forming arc within the chamber and that wall. In addition, the injector structure includes means for introducing a swirl component into the axial gas flow in the annular sheath for stabilization purposes. In the preferred embodiment, this gas sheath flow is supplied from an annular chamber into which a gas is introduced in a radial direction from a plurality of equally spaced points. A separate set of generally tangentially directed orifices is utilized in the preferred embodiment for imparting a swirl component to the axial flow of gas from this annular chamber to provide the uniform distribution of the gas in the sheath. Other techniques for imparting and varying the swirl component, such as adjustable vanes, will be obvious to those skilled in the art. It is also desirable to include a set of axially directed orifices principally for controlling the location of the arc formed in the plasma chamber. By proportioning the amount of gas that flows through the several orifices, control of the location, the geometry and the stability of the plasma for a variety of gases is enabled. For example, the gas flow through the axially directed orifices may be used solely as a control means for monotomic gases while the major portion of the gas is supplied through the radial or swirl orifices or both, and each at a different velocity if desired. In fact, in the normal case, the axial flow is adjusted mainly to keep the plasma from approaching too closely the gas entering end of the plasma chamber when operating on an easily ionized gas like argon and the swirl flow is adjusted as necessary to stabilize the gas sheath formed by the radial flow.

Another feature of the preferred embodiment is the improved cooling of the wall of plasma chamber obtained by flowing the coolant fluid directly in contact with the wall of the chamber and over the induction coil while further enabling the induction coil to be placed immediately adjacent the plasma chamber so that the coupling of the electromagnetic field to the arc in the chamber is maximized. Another feature of the preferred embodiment is the use of a metal nozzle plate of conductive material which provides protection for the support of the refractory wall member of the plasma chamber. The nozzle plate configuration is useful in the initiation of an arc in the generator. A further feature is the mounting structure for the plasma chamber which enables that chamber to be structurally coupled to other components for particular types of processes, and to be pressurized or evacuated for various types of operation. The nozzle plate arrangement enables the configuration of the plasma to be varied. The apparatus enables stable high temperature operation in which a plasma flame that extends a substantial distance beyond the plasma chamber is produced.

Other objects, features, and advantages of the invention will be seen as the following description of particular embodiments thereof progresses, in conjunction with the drawings, in which:

FIG. 1 is a cross-sectional side view of an induction plasma generator constructed in accordance with the invention;

FIG. 2 is an end view of the generator structure shown in FIG. 1 with the nozzle plate and O ring support removed;

Figure 3:
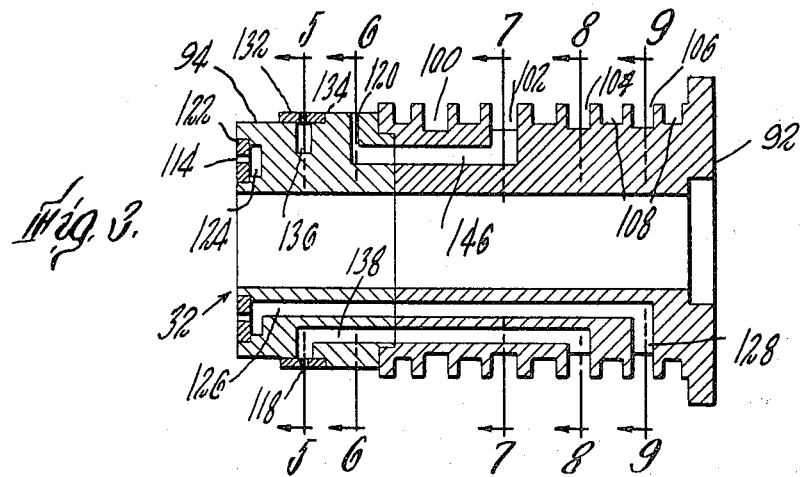
FIG. 3 is a cross-sectional view of the injector structure employed with the plasma generator shown in FIG. 1.
Figure 4:
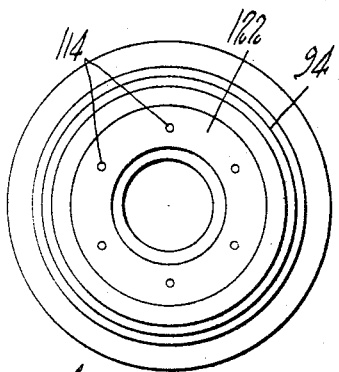
FIG. 4 is an end view of the injector structure shown in FIG. 3.
Figure 5:
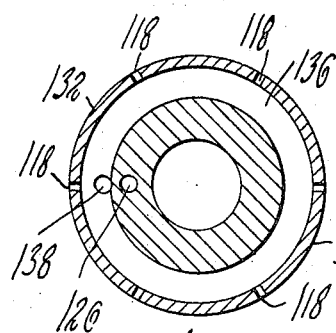
FIGS. 5–9 are cross-sectional views taken along the lines 5—5, 6—6, 7—7, 8—8 and 9—9 of FIG. 3.
Figure 6:
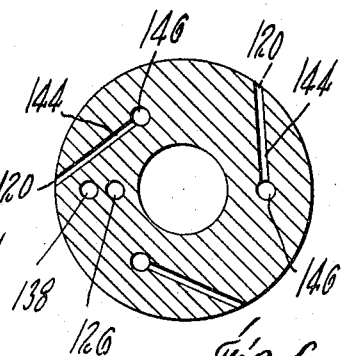
Figure 7:
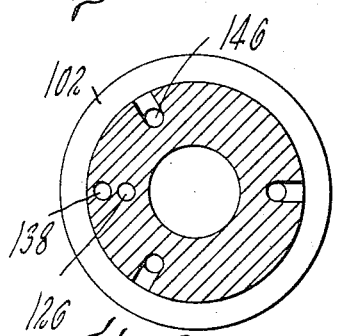
Figure 8:
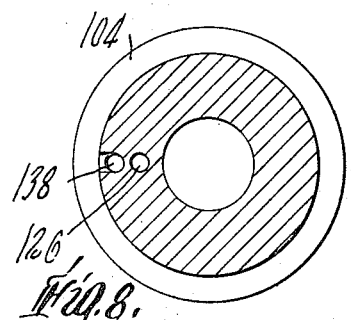
Figure 9:
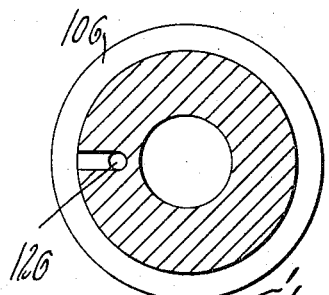

The induction plasma generator structure shown in FIG. 1 includes a tubular housing 10 of uniform and high dielectric integrity which is unaffected by the coolant employed. A suitable material for housing 10 is polytetrafluoroethylene (Teflon). Supported within the bore of housing 10 is an induction coil 12, the ends 14, 16, of which are soldered to threaded terminal elements 18, 20. In the embodiment shown, this coil is of 3/32" round copper wire configured to provide four turns over a length of 2¾" between terminals 14 and 16 about a 1¾" I.D.

Disposed within the induction coil 12 is a quartz cylinder 22 that has a thin layer 24 of thermally reflective material such as gold on its inner surface. This layer may extend over the entire inner surface of cylinder 22 or only a portion thereof, as for example, in the vicinity of the discharge end. Cylinder 22 is rigidly supported within housing 10 by resilient O ring support elements 26, each of which is housed within support element retainer structures 28 so that the quartz tube is positively, yet resiliently, supported relative to the housing 10.

The quartz tube 22 defines a chamber 30, 1½" in diameter, in which plasma is formed under the influence of an electromagnetic field generated by the induction coil 12. The gas to be converted to plasma is introduced into the region 30 through injector structure 32 which is mounted in an aluminum retainer structure 34 that is secured to the housing 10 by means of fasteners 36. Mounted on the inlet end of the assembly is an aluminum retaining end plate 38, and mounted on the outlet end is an aluminum nozzle plate 40.

A metal, water-cooled probe 42, mounted in fitting 44 which is threadedly secured to end plate 38, extends centrally through the bore of injector structure 32 and protrudes into the plasma chamber 30. This probe has a central bore 46 surrounded by a double walled passage 47 which provides an ingoing annular passage connected to inlet coolant conduit 48 and an outgoing annular return passage surrounding the ingoing passage connected to outlet coolant conduit 50. Material to be injected into the plasma chamber is introduced through conduit 52. The probe is secured in position by O ring 54 which acts against the tapered seat of fitting plug 44 in cooperation with sleeve 56 in the injector 32. When plug 44 is loosened, the probe may be moved inwardly or outwardly to change the extent of its protrusion into the plasma chamber 30.

The generator structure further includes a closed coolant circulating system in which a coolant (such as water) is introduced through channel 60 in terminal member 62 that is threadedly secured to terminal element 20. A first duct 64 leads from distributing chamber 63 in the axial direction to an annular recess 100 in the injector structure 32 and a second duct 66 extends from the opposite side of that annular recess to cylindrical channel 68 for flow between the housing 10 and quartz cylinder 22 and over induction coil 12 to the forward end of the structure to chamber 70 comprised of arcuate compartments formed in the housing at that point. There is also provided a parallel flow path through duct 72 along into the same cylindrical channel 68 that bypasses injector 32 and provides additional flow of cooling water to the forward end of the generator. Outlet duct 74 from chamber 70 is connected to the chamber 75 in which terminal structure 76 is disposed for completion of the flow path to outlet 78. It will be noted that ribs in chamber 70 support the O ring retainer 28 in position in that chamber while allowing flow of coolant around that retainer and the nozzle plate 40.

Nozzle plate 40 includes a flange 80 which projects inwardly toward chamber 30 and overlies the end 82 of the quartz tube 22 and thus provides a thermal barrier which provides protection for the O ring 24. The nozzle plate may be formed in a variety of configurations for shaping the flow of plasma from the plasma chamber 30.

Suitable seals such as O rings 88 are provided between the several components of the plasma generator structure to prevent contaminating flow between the coolant passages and the plasma gas passages.

The injector structure 32 is shown in greater detail in FIGS. 3–9. That structure includes a body portion 92 and a nose portion 94. The body portion 92 includes a series of axially spaced annular recesses about its outer surface which provide uniform distribution of coolant, e.g. recess 100, and plasma supply gases, e.g. recesses 102, 104, and 106. There are also provided isolating annular recesses 108 on each side of the distributing recesses in which are disposed sealing members 110 (FIG. 1) which act to prevent transfer of the fluid introduced in one distributing recess to the adjacent recesses.

In the nose portion 94, there are three separate sets of plasma gas distributing orifices, a set of six axially directed orifices 114 (each 0.028" in diameter), a set of six radially directed orifices 118 (each 0.028" in diameter), and a set of three generally tangentially directed swirl orifices 120 (each 0.033" in diameter). The axially directed orifices are formed in an annular plate 122 which is secured in a recess in the face of injector nose structure 94 so that an annular distributing chamber 124 (0.062" deep and 0.156" wide) is defined beneath the orifice plate 122. A passage 126 extends through nose 94 and base 92 to an inlet passage 128 formed in retainer structure 34 which in turn is connected to inlet conduit 130 (FIG. 1).

The radial orifices 118 are formed in a cylindrical ring 132 which is seated on a flange 134 of the injector nose piece and soldered in place. An annular distributing chamber 136 (0.100" deep and 0.150" wide) is located in the nose piece behind ring 132 and in alignment with the orifices 118. A conduit 138 passes from that chamber through the nose pece, the base member and an outlet passage formed in retainer member 34, to coupling 142.

The swirl orifices 120 are connected by passages 144 to channels 146 axially extending which extend distributor recess 102 which in turn is connected to passage 148 and inlet conduit 150.

Figure 10:
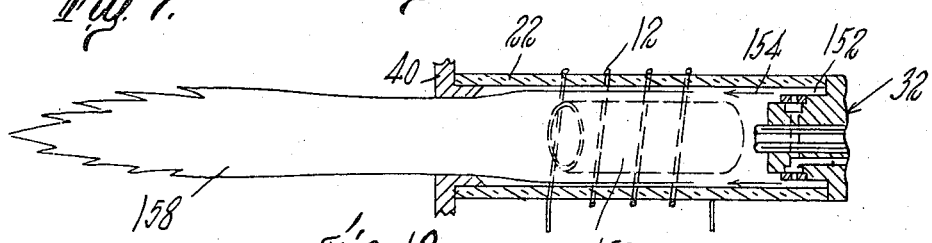
FIG. 10 is a diagram indicating the nature of operation of the plasma generator.

With reference to FIGS. 1 and 10, the radial orifices 118 and the swirl orifices 120 discharge into an annular chamber 152 of a width in the order of 0.040" and about ½" in length so that the gas flow from chamber 152 is formed into an annular sheath 154 having generally laminar flow characteristics. The swirl orifices 120 disposed in the annular chamber behind the radial orifices 118 are utilized to impart a tangential component to the flow of gas from chamber 152 for gas sheath stabilization purposes. An arc 156 of thin walled cylindrical configuration is established under the influence of the electromagnetic field created by coil 12 which acts on the gas flow to create a plasma 158 which projects a substantial distance out of the plasma forming chamber 30. In addition, the axial orifices 114, which are located approximately half way between the wall and the center of plasma chamber 30, are available for selective modification of the gas flow from the annular sheath and principally for control of the arc region 156 relative to the injector structure 32 while a portion of the gas sheath 154 moves along the wall of the quartz tube 22 with characteristics that approach laminar flow. Through variation of the gas flow through the radial and swirl orifices, the configuration of the plasma 158 may be controlled.

Figure 11:
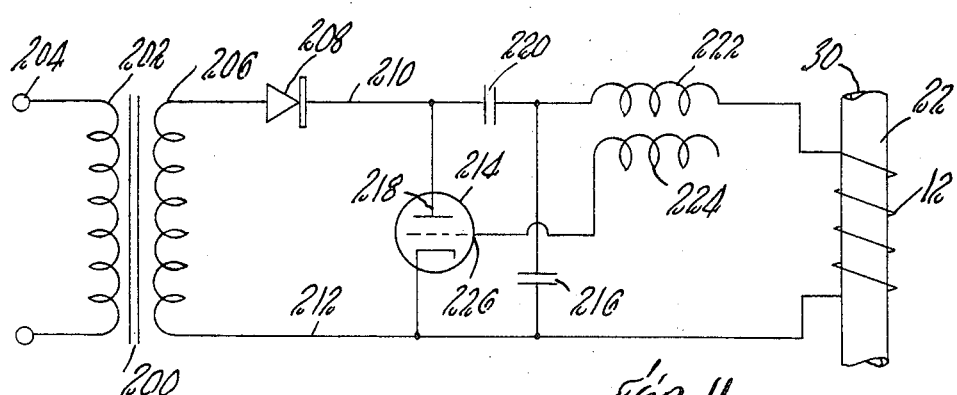
FIG. 11 is a simplified schematic diagram of electronic circuitry for energizing the apparatus shown in FIG. 1.

A simplified schematic diagram of a suitable electrical system for the induction plasma generator is shown in FIG. 11. This electrical system is of conventional induction heating design and includes a high-voltage transformer 200, the primary winding 202 of which is coupled to a sixty cycle source at terminals 204. A three phase source is typically employed. The transformer's secondary winding 206 is coupled through a rectifier 208 to provide DC power (preferably filtered to limit the ripple to less than 4%) on lines 210, 212, for application to an oscillator circuit that includes oscillator tube 214 and a tank circuit including a coil 12 of the torch and capacitor 216. Connected in series between the plate 218 of tube 214 and the tank circuit is blocking capacitor 220. Coil 222 in the tank circuit is inductively coupled via coil 224 to the grid 226 of the oscillator tube 214.

Figure 12:
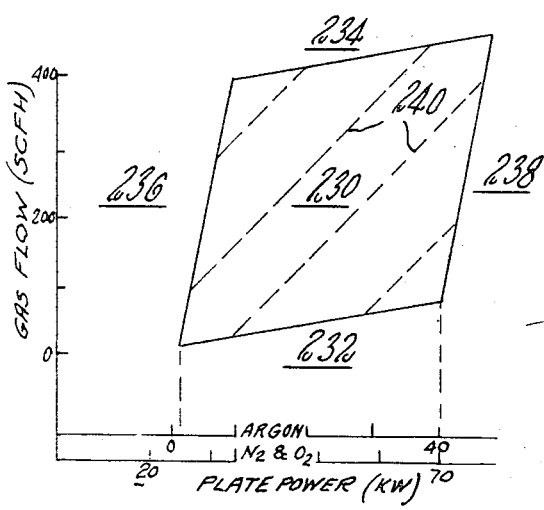
FIG. 12 is a graph indicating operation of the generator on different types of gases.

Operating characteristics of the plasma generator are indicated in the graph of FIG. 12. In this graph, flow of the plasma forming gas into the plasma chamber 30 is indicated on the ordinate and the power in kilowatts (DC) at the plate 218 of the oscillator tube as a function of plasma gas flow plotted on the abscissa. As indicated in FIG. 11, the generator has a tetragonal region of stable operation 230. The limits of this region of stable operation are: (1) gas flow is too low and the arc is unstable in space (region 232); (2) gas flow is excessive resulting in small unstable arc which tends to be blown out of the tube 22 (region 234); (3) inadequate power applied to the plasma forming chamber 30 and the arc is too small (region 236); and (4) the input power exceeds the cooling capabilities of the generator, the arc is too large and failure occurs due to the cracking of the quartz tube 22 for example (region 238). Within the region 230 of stable operation, there are indicated diagonal lines 240 of isothermal operation. The upper left-hand corner of the region 230 is the region of the lowest temperature of the plasma and the lower right-hand corner is the region of highest temperature.

A typical operation of the plasma generator utilizing a four megacycle frequency is to initiate a plasma by introducing argon gas at 48 s.c.f.h. through axial inlet 130, no gas through radial inlet 142 and gas at a rate of 96 s.c.f.h. through swirl inlet 150. The oscillator circuit is adjusted to a plate power of 9 kw. (1.5 amperes at 6000 volts) and plasma is initiated by sparking at the conductive lining 24 of tube 22 which is generated due to the intense electromagnetic field created in the plasma chamber 30. The foil is of relatively high resistance and small arcs are created that sufficiently ionize the argon to initiate the plasma arc. Alternatively, the plasma arc may be initiated by the temporary insertion of a graphite rod through the opening in nozzle plate 40 which rod is heated by the electromagnetic field established by coil 12. The arc may also be initiated by grounding one of the metal end plates 38 or 40. Still another method of initiating the plasma arc is through the use of an auxiliary DC powered arc. The latter method is particularly useful with lower oscillator frequencies, such as in the order of 450 kc. After the plasma is created, a transition may be made to a diatomic gas such as nitrogen or oxygen. As an example of such a transition, nitrogen at a flow rate of 70 s.c.f.h. is applied to radial inlet 142 and at a flow rate of 28 s.c.f.h. to swirl inlet 150. The argon flow at inlets 130 and 150 is then terminated as quickly as possible. During this transition, the plate power is increased to 30 kw. or above and maintained at that level to maintain the diatomic gas plasma. The resulting plasma flame extends sixteen inches beyond nozzle plate 40. The extent of the plasma flame can be reduced by increasing the flow at the swirl inlet and, for normal operation in which a long flame is desired, it is preferred that the swirl component of the total sheath flow be less than 33%.

Figure 13:
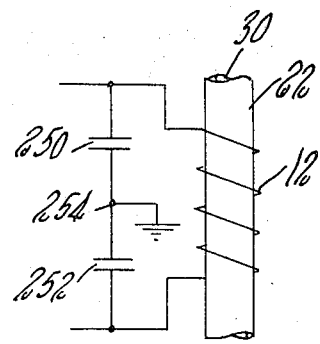
FIG. 13 is a schematic diagram of a modified form of oscillator tank circuit.

In operation with the circuitry shown in FIG. 11, it has been found that grounding either end plate 38 or nozzle plate 40 will cause an extinguishment of the plasma. For many applications of this plasma generator, this characteristic is undesirable and may be eliminated through use of a type of circuit connection diagrammatically shown in FIG. 13. In this arrangement, two capacitors 250, 252, are employed in series in the tank circuit of the oscillator and the junction 254 between the two capacitors is grounded. Each capacitor 250, 252 may be coupled to a separate oscillator tube in a duplex arrangement, for example.

Figure 14:
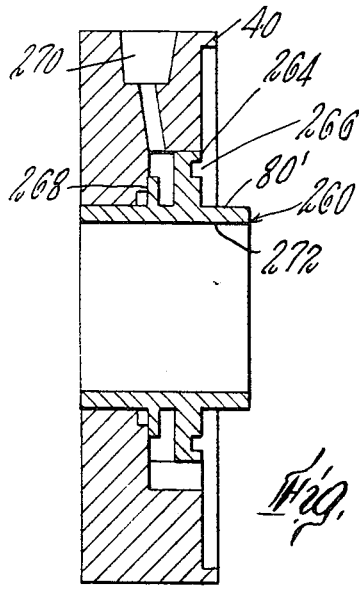
FIGS. 14 and 15 are sectional views of alternate forms of nozzle structures suitable for use with the plasma generator shown in FIG. 1.
Figure 15:
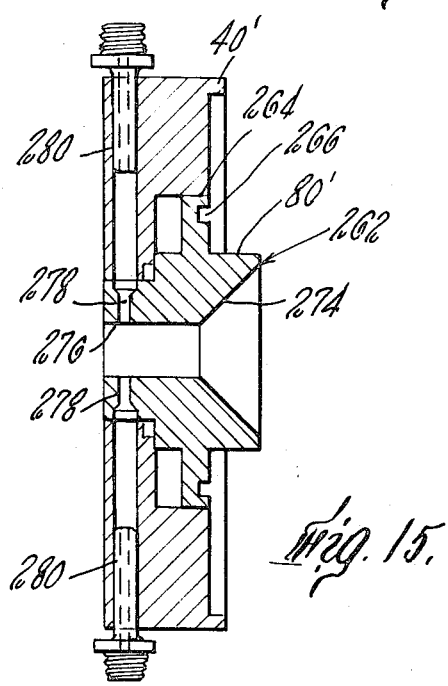

As indicated above, the nozzle plate 40 may take a variety of configurations. Two useful configurations are indicated in FIGS. 14 and 15. In each case, the nozzle plate 40' receives an insert 260, 262, each of which is manufactured of copper and includes an inwardly extending flange 80' that overlies the end of quartz tube 22 and a radially extending support flange 264 that includes groove 266 in which a sealing member (not shown) is disposed. Nozzle insert 260 (FIG. 14) includes an auxiliary cooling fin 268 which defines one wall of a chamber through which supplementary cooling fluid may be introduced through port 270 in nozzle plate 40'. The bore 272 of this nozzle insert may have diameters over the range of ⅛"–1¼". The nozzle insert 262 indicated in FIG. 15 has a tapered transition 274 to the exit channel 276. That channel may have diameters over the range ¼"–¾". Also, injector ports 278 extend radially through the walls of the nozzle into exit channel 276 and are aligned with supply ducts 280 in nozzle plate 40'. Material to be mixed in the plasma jet exiting from the generator for spheroidizing purposes for example, may be introduced through ports 278.

The nozzle of this plasma generator structure may take a variety of configurations, for example, a plurality of parallel paths for multiple jets or a star cross section to modify the shape of the jet. The nozzle plate is continually subjected to cooling fluid and through its heat transfer characteristics protects the refractory tube 22 and its resilient support 26. Also, that plate, together with retainer plate 38, are electrically isolated by housing 10 and tube 22 so that they may function as components of the electrical control of the generator. This structure also enables the pressure condition in the plasma chamber 30 to be controlled, thus extending the range of useful operation of the generator.

While particular embodiments of the invention have been shown and described, various modifications will be obvious to those skilled in the art. The specific dimensions and configurations of these embodiments are disclosed for illustrative purposes and not as limitations

What is claimed is:

1. An induction plasma generator comprising means defining a plasma forming chamber, a high frequency electrical coil disposed around said chamber for creating an electromagnetic field within said chamber, and means at one end of said chamber for introducing gas for axial flow in an annular sheath along the wall of said chamber for passage through said electromagnetic field and conversion into plasma condition, and independently controllable means for imparting a tangential component to the flow of gas in said annular sheath, the principal component of gas flow in said sheath being axial and said tangential component being used for stabilization purposes to make the velocity profile of said principal component in said annular sheath more even.

2. The apparatus as claimed in claim 1 wherein said gas introducing means includes an injector structure having a plurality of outlets for discharging gas in a direction having a radial component relative to the axis of said plasma forming chamber, and a wall structure surrounding said injector structure and spaced therefrom to define an annular chamber into which the gas from said plurality of outlets is discharged.

3. The apparatus as defined in claim 1 wherein said independently controllable means includes an injector structure having a plurality of outlets for discharging gas in a generally tangential direction relative to the axis of said plasma forming chamber.

4. The apparatus as claimed in claim 1 and further including separate orifice means for introducing gas into said plasma forming chamber in an axial direction inside of said annular sheath.

5. The apparatus as claimed in claim 1 wherein said gas introducing means includes a metal injector structure having a plurality of outlets for discharging gas in a direction having a radial component relative to the axis of said plasma forming chamber, a wall structure spaced from said plurality of outlets to define an annular chamber into which the gas from said plurality of outlets is discharged and from which said gas flows in a direction coaxial with the axis of said plasma forming chamber in said annular sheath, said independently controllable means includes a plurality of outlets in said injector structure for discharging gas in a generally tangential direction relative to the axis of said plasma forming chamber, and means for flowing coolant fluid in contact with said injector structure for cooling said injector structure.

6. An induction plasma generator comprising a tubular member of fluid impervious dielectric material having a low coefficient of thermal expansion and capable of withstanding high temperatures for defining a plasma chamber, a high frequency coil disposed around said tubular member in close proximity to the outer wall thereof for creating an intense electromagnetic field within said chamber, a housing surrounding said tubular member and spaced therefrom to define a chamber for receiving said electrical coil and means to flow coolant fluid through said chamber for directly contacting said coil and the outer wall of said tubular member for cooling said coil and said tubular member, means at one end of said chamber for defining a discharge opening, and means at the other end of said chamber for introducing gas under pressure into said chamber for conversion into plasma condition.

7. An induction plasma generator comprising a tubular member of dielectric material having a low coefficient of thermal expansion and capable of withstanding high temperatures for defining a plasma chamber, a high frequency coil disposed around said tubular member in close proximity to the outer wall thereof for creating an intense electromagnetic field within said chamber, a housing surrounding said tubular member and spaced therefrom to define a chamber for receiving said electrical coil and means to flow coolant fluid through said chamber for directly contacting said coil and the outer wall of said tubular member for cooling said coil and said tubular member, means at one end of said chamber for defining a discharge opening, and means at the other end of said chamber for introducing gas under pressure into said chamber for conversion into plasma condition, said gas introducing means including means for forming the gas into an annular sheath for flow along the inner wall of said tubular member and independently controllable means for imparting a tangential component to the flow of gas in said annular sheath for stabilization purposes.

8. The apparatus as claimed in claim 7 wherein said gas introducing means includes an injector structure having a plurality of outlets for discharging gas in a direction having a radial component relative to the axis of said plasma chamber, and a wall structure surrounding said injector structure and spaced therefrom to define an annular chamber into which the gas from said plurality of outlets is discharged.

9. The apparatus as defined in claim 7 wherein said independently controllable means includes an injector structure having a plurality of outlets for discharging gas in a generally tangential direction relative to the axis of said plasma chamber.

10. The apparatus as claimed in claim 7 and further including separate orifice means for introducing gas into said plasma chamber in an axial direction inside of said annular sheath.

11. An induction plasma generator comprising a tubular member of dielectric material having a low coefficient of thermal expansion and capable of withstanding high temperatures for defining a plasma forming chamber with a discharge opening at one end of said tubular member, a high frequency electrical coil disposed around said tubular member for creating an intense electromagnetic field within said plasma forming chamber, and means at the other end of said tubular member defining separate orifices for introducing gas under pressure simultaneously into said chamber along separate axially, radially and tangentially directed paths for passage through said electromagnetic field and conversion into plasma condition.

12. The apparatus as claimed in claim 11 wherein the radially and tangentially directed paths are directed outwardly towards the wall of said tubular member.

13. The apparatus as claimed in claim 11 wherein said orifices include a series of equidistantly spaced identical parallel axially extending orifices, a series of equidistantly spaced identical radially directed orifices and a series of equidistantly spaced identical tangentially directed orifices.

14. The apparatus as claimed in claim 11 and further including a hollow probe adapted to extend into said plasma chamber from said other end along the axis of said tubular member concentrically within and beyond said orifices, said probe including circulation means for receiving fluid for flow along the walls of said probe to cool said probe.

15. The apparatus as claimed in claim 11 and further including a nozzle plate disposed over said discharge opening adapted to receive different nozzle components for varying the dimensions of the discharge opening and the configuration of the flow of plasma through that discharge opening.

16. The apparatus as claimed in claim 15 wherein said nozzle plate is of thermally conductive material and includes a flange portion projecting into plasma chamber and overlying the end of said tubular member to provide a thermal barrier between the plasma and the end of said tubular member.

17. The apparatus as claimed in claim 11 and further including a housing of dielectric material disposed over said tubular member and an electrically conductive end plate secured to each end of said housing.

18. The apparatus as claimed in claim 17 wherein said coil forms a portion of an oscillator tank circuit and wherein said tank circuit further includes two capacitors connected in series, and means to ground the junction between said two capacitors.

19. The apparatus as claimed in claim 11 and further including metallic foil disposed on the inner surface of said tubular member.

20. The method of operating a plasma generator having a tubular member of dielectric material, a metal plate at each end of said tubular member, and an electrical coil disposed over said tubular member between said metal plates comprising the steps of energizing said coil to create an intense electromagnetic field within said tubular member, flowing a gas through said tubular member, and modifying the electric potential condition of one of said plates to create an arc within said member to initiate a plasma condition in said gas under the influence of said electromagnetic field.

21. The method of claim 20 wherein said electric potential condition is modified by grounding one of said plates.

22. An induction plasma generator comprising a tubular member of dielectric material having a low coefficient of thermal expansion and capable of withstanding high temperatures for defining a plasma chamber, a high frequency coil disposed around said tubular member in close proximity to the outer wall thereof for creating an intense electromagnetic field within said chamber, a housing surrounding said tubular member and spaced therefrom to define a chamber, means to flow coolant fluid through said chamber for directly contacting the outer wall of said tubular member for cooling said tubular member, means at one end of said chamber for defining a discharge opening, a nozzle plate disposed over said discharge opening adapted to receive different nozzle components for varying the dimensions of the discharge opening and the configuration of the flow of plasma through that discharge opening, said nozzle plate being of thermally conductive material and including a flange portion projecting into said plasma chamber and overlying the end of said tubular member to provide a thermal barrier between the plasma and the end of said tubular member, and means at the other end of said chamber for introducing gas under pressure into said chamber for conversion into plasma condition.

23. An induction plasma generator comprising a tubular member of dielectric material having a low coefficient of thermal expansion and capable of withstanding high temperatures for defining a plasma chamber, a high frequency coil disposed around said tubular member in close proximity to the outer wall thereof for creating an intense electromagnetic field within said chamber, a housing of dielectric material surrounding said tubular member and spaced therefrom to define a chamber for receiving said electrical coil and means to flow coolant fluid through said chamber for directly contacting said coil and the outer wall of said tubular member for cooling said coil and said tubular member, an electrically conductive end plate secured at each end of said housing, means at one end of said chamber for defining a discharge opening, and means at the other end of said chamber for introducing gas under pressure into said chamber for conversion into plasma condition.

24. An induction plasma generator comprising a tubular member of dielectric material having a low coefficient of thermal expansion and capable of withstanding high temperatures for defining a plasma forming chamber with a discharge opening at one end of said tubular member, metal foil disposed on the inner surface of said tubular member, a high frequency electrical coil disposed around said tubular member for creating an intense electromagnetic field within said plasma forming chamber, and means at the other end of said tubular member for introducing gas under pressure into said chamber for passage through said electromagnetic field and conversion into plasma condition.

25. An induction plasma generator comprising a tubular member of dielectric material having a low coefficient of thermal expansion and capable of withstanding high temperatures for defining a plasma forming chamber with a discharge opening at one end of said tubular member, a high frequency electrical coil disposed around said tubular member for creating an intense electromagnetic field within said plasma forming chamber, means at the other end of said tubular member for introducing gas under pressure into said chamber for passage through said electromagnetic field and conversion into plasma condition, an electrically conductive end plate secured to each end of said tubular member, an oscillator tank circuit of which said coil forms a portion, said tank circuit further including two capacitors connected in series, and means to ground the junction between said two capacitors.

References Cited
UNITED STATES PATENTS

| | | | |
|---|---|---|---|
| 2,964,678 | 12/1960 | Reid | 313—231 X |
| 3,264,508 | 8/1966 | Lai et al. | 313—231 X |
| 3,296,410 | 1/1967 | Hedger | 313—231 X |
| 3,324,334 | 6/1967 | Reed | 313—231 |
| 3,343,022 | 9/1967 | Eckert | 313—231 X |

JAMES W. LAWRENCE, *Primary Examiner.*

P. C. DEMEO, *Assistant Examiner.*